United States Patent [19]
Gross

[11] 3,942,808
[45] Mar. 9, 1976

[54] PISTON RING ASSEMBLY

[75] Inventor: Dario R. Gross, Owosso, Mich.

[73] Assignee: Midland-Ross Corporation, Cleveland, Ohio

[22] Filed: Nov. 8, 1974

[21] Appl. No.: 522,005

Related U.S. Application Data

[63] Continuation of Ser. No. 363,976, May 25, 1973, abandoned.

[52] U.S. Cl. ............................ 277/197; 277/236
[51] Int. Cl.² ........................................ F16J 15/00
[58] Field of Search ........... 277/193, 197, 236, 173, 277/192, 216

[56] References Cited
UNITED STATES PATENTS

| | | | |
|---|---|---|---|
| 1,804,848 | 5/1931 | Sandberg et al. | 277/192 |
| 2,068,042 | 1/1937 | Teetor | 277/173 |
| 2,459,395 | 1/1949 | Smith | 277/216 |
| 2,918,340 | 12/1959 | Knoebel | 277/193 |
| 2,940,803 | 6/1960 | Phillips | 277/235 A |
| 2,970,023 | 1/1961 | Thompson | 277/236 |
| 3,174,762 | 3/1965 | Hesling et al. | 277/193 |
| 3,456,954 | 7/1969 | Prass et al. | 277/216 |

*Primary Examiner*—Samuel B. Rothberg
*Attorney, Agent, or Firm*—Frank J. Nawalanic; H. Duane Switzer

[57] ABSTRACT

A piston ring assembly having a pair of resilient split rings of identical cross section in a single piston groove in which the rings contact each other over a large surface to maintain the gap of one ring diametrically opposed relative to the gap of the other ring to resist passage of oil and compressed gases. The rings each have a separate line contact with the piston which accomplishes sealing without imposing frictional loads detracting from the radial expansion of the rings to produce a tight seal against the cylinder walls. The rings afford spaced seals with the cylinder wall to form an annular oil containing cavity for controlled lubrication of the cylinder wall.

1 Claim, 3 Drawing Figures

PISTON RING ASSEMBLY

This is a continuation of application Ser. No. 363,976, filed May 25, 1973, and now abandoned.

SUMMARY OF THE INVENTION

This invention relates to piston rings and more particularly to rings of the type used for compression of gases such as with pistons of reciprocating air compressors.

Rings which are used for compression purposes with pistons and cylinders are usually of the split type which in their free state have a gap between the ends of the ring and are larger in diameter than the cylinder. The rings are compressed radially inward to fit within a groove in the piston and the tendency for the ring to resume it original shape exerts a radial outward force to seat the face of the ring against the cylinder wall. The gap is reduced and the ends are closely adjacent to each other. Nevertheless, when a single ring is used in a piston groove, lubricating oil passes through the gap toward the cylinder head on the suction or downward stroke of the piston and the gases in the cylinder head leak from the head through the gap upon the compression or upward stroke. In an effort to avoid this problem rings have been formed with ends of various configuration. Also efforts have been made to use two rings in a single groove with the two gaps diametrically opposed to form a more torturous path for the passage of oil or compressed gases. Such arrangements have relied on interlocking ring portions which have made the rings difficult to make and expensive or have required the use of two rings of different configurations which is undesirable from an assembly and replacement standpoint.

In addition to the sealing between the cylinder wall and the ring, it also is necessary to maintain sealing between the ring and the piston. This usually is accomplished by utilizing rings and grooves of very precise dimensions so that a close fit is provided. Such fits, however, impose frictional loads between the walls of the groove and the ring which must be overcome by the radial outward biasing of the ring which is needed for producing face pressure against the cylinder wall. Because of this it sometimes is necessary to use additional spring devices to supplement the spring force of the rings.

During the compression stroke of a piston, the pressure of the gases may be relied upon to increase the face pressure between the ring and the cylinder wall but this action is not available during the suction stroke of the piston at which time gases are drawn into the head of the cylinder. Such operation also is not available at other times with air compressors of the type used to supply the brake systems of motor vehicles. Such compressors usually are reciprocated continuously but compress air within a fixed predetermined range as demand requires. As a result the action of compressed gases is not available to assist sealing forces during a majority of the time that the piston is reciprocated.

It is an object of the invention to provide a piston ring assembly in which a pair of identical rings are disposed in a ring groove in a piston to provide line-contact sealing between the piston and the rings which afford maximum utilization of the radial forces due to the resiliency of the rings to maintain high sealing contact between the rings and the cylinder.

Also it is an object of invention to provide a piston ring assembly in which a pair of identical rings are disposed with their gaps angularly displaced and engage each other in a manner insuring that circumferential movement of one ring is transferred to the other ring to maintain the angular displacement of gaps.

Another object of invention is to provide a ring assembly disposed to form a reservoir of oil which lubricates the walls of the cylinder at a controlled rate.

A piston ring assembly has been provided in which a pair of split rings of identical cross section are disposed in a single groove in the piston so that the gaps are angularly displaced relative to each other to minimize the passage of oil and gases so that each ring can act independently to form a complete seal with the piston without imposing unnecessary frictional forces which detract from the radial pressure which the rings impose on the cylinder wall. The radial pressure is applied to the cylinder at spaced annular lines of contact which not only improves the sealing and the oil wiping action, but also the rings act to form an annular oil retaining cavity against the cylinder wall for controlled lubrication.

DETAILED DESCRIPTION

Figure 1:
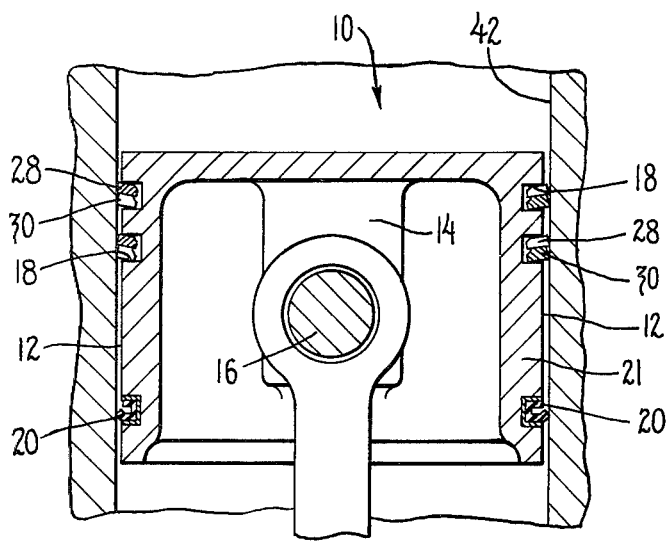
FIG. 1 is a cross sectional view of a piston with the ring assembly of the present invention.

As seen in FIG. 1, a compressor piston of generally conventional configuration is designated at 10. The piston 10 is generally cup shaped with a cylindrical outer wall 12 and diametrically opposed apertured bosses 14, only one of which is shown, for receiving the opposite ends of the usual connecting rod wrist pin 16.

The piston 10 is shown with upper and lower compression ring grooves 18 located in the outer wall 12 of the piston 10 above the wrist pin 16 and an oil ring assembly 20 located below the wrist pin 16 in the skirt 21. The compression ring grooves 18 each have an upper annular wall 22 and a lower annular wall 24 which are generally parallel to each other and a cylindrical wall 26 at the root of the ring grooves 18. Upper and lower is meant to refer toward the head end and toward the skirt end of a piston respectively, since the piston could reciprocate on an axis other than vertical.

Disposed in each compression ring groove 18 are an upper ring 28 and a lower ring 30 which are identical to each other. The rings 28 and 30 are generally rectangular in cross-section and each ring has a relatively narrow upper face 32 and a relatively wider lower face 34 which is parallel to the upper face 32. Each ring 28 and 30 has an outer face surface 36 which is preferably tapered so that the outer face is at an angle of less than 90 degrees with the lower face 34. Each ring also has an inner wall surface 37 which merges with an inside beveled surface 38.

Figure 3:
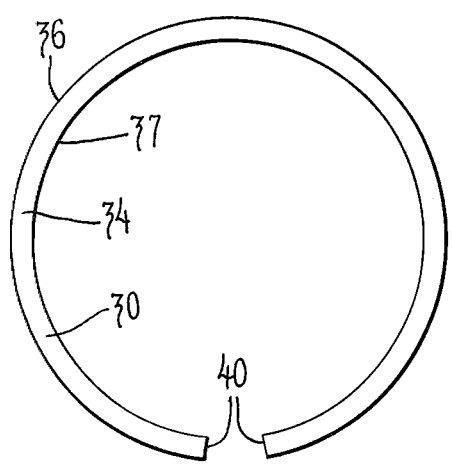
FIG. 3 is a top plan view of one ring in its free unassembled state.
Figure 2:
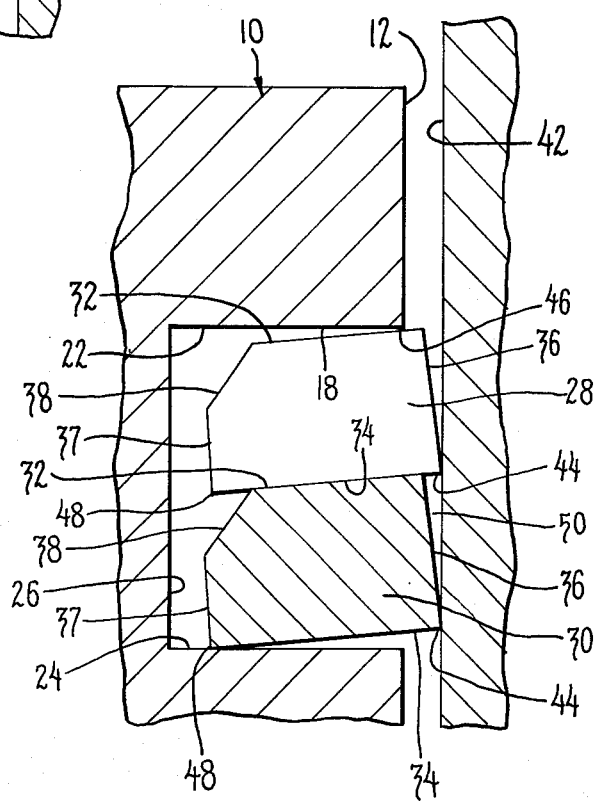
FIG. 2 is a greatly englarged portion of one of the ring assemblies in FIG. 1 showing the relationship to a cylinder wall.

In the free state of the rings 28 and 30, one of which is shown in FIG. 3, there is a wide gap between the ends 40. Upon assembly of the rings 28 and 30 into a ring groove 18 and positioning of the piston 10 into a cylinder which is designated at 42 in FIG. 2, the gaps in the rings 28 and 30 are closed so that the split ends 40 of the rings are closely adjacent to each other. Moreover, as the rings 28 and 30 are biased radially inward to fit within the ring groove 18 and within the cylinder 42, the rings become twisted to assume an angled or dished position so that in cross-section as seen in FIG. 2, the upper and lower faces 32 and 34 of each of the rings 28 and 30 remain parallel to each other but are disposed at an angle to the upper and lower groove walls 22 and 24. Such rings are known as positive twist rings and when the pair of rings 28 and 30 are disposed in their respective ring grooves 18, the split portion formed by the ends 40 of the upper ring 28 is disposed diametrically opposite the gap formed by the split ends 40 of the lower ring 30.

As will be seen from FIG. 2, the rings are disposed in their respective grooves 18 so that the lower face 34 of the upper ring 28 and the upper face 32 of the lower ring 30 engage each other with full contact. A lip 44 on each of the rings 28 and 30 which is formed at the juncture of the outer face 36 and lower face 34 engages the wall of the cylinder 42. Also the upper face 32 of the upper ring 28 engages an annular edge 46 formed on the piston 10 by the juncture of the upper wall 22 of the groove 18 and the outer cylindrical side wall 12 of the piston 10. Each of the rings 28 and 30 also has an annular edge 48 of the lower face 34 and the inner wall 37. The annular edge 48 of the lower ring 30 engages the lower wall 24 of the ring groove 18.

When the pairs of rings 28 and 30 are assembled into their respective ring grooves 18, they are compressed radially inwardly which causes the rings to assume the twisted position illustrated in FIG. 2, which results in the rings being slightly defective in an axial direction. This causes the rings 28 and 30 to be tightly pressed together and to exert pressure axially of the piston 10 at the upper annular edge 46 and in an opposite direction at the lower annular edge 48 of the lower ring 30. The lines of contact at the annular edge 46 of the piston and the annular edge 48 of the lower ring 30 form effective seals between the piston 10 and the rings 28 and 30. At the same time, the bottom face 34 of the upper ring 28 forms an effective seal with the upper face 32 of the lower ring 30. Also the lip 44 of each of the rings 28 and 30 forms a seal with the wall of the cylinder 42. Each pair of rings 28 and 30 forms an annular chamber 50 defined by the outer face 36 of the lower ring 30, a radial outer portion of the bottom face 34 of the upper ring 28 and the wall of the cylinder 42 between the ring lips 44.

Each of the rings 28 and 30 acts generally independently of each other to provide seals between the piston and the cylinder. The upper ring 28 provides a line contact seal at the annular edge 46 and the lower ring 30 provides a line contact seal at the annular edge 48. Because the rings act independently of each other to accomplish their sealing function, the necessity of maintaining the upper wall 22 and the lower wall 24 of the ring grooves 18 in perfect parallel alignment is not as critical as when a single ring is used.

During reciprocation of the piston 10 in its cylinder 42, effective seals are provided at the lips 44, the annular edges 46 and 48, and the two mating surfaces 34 and 32. During the downward stroke of the piston 10, the lips 44 act to scrape oil which has accumulated on the side walls of the cylinder 42 and leave a very thin film. At the same time oil is retained in the cavity 50 between the lips 44 to afford ample lubrication.

During compression on the upward movement of the piston 10, the high pressure in the cylinder head causes the rings 28 and 30 to be distorted downwardly so that the lips 44 are pressed into tight engagement with the wall of the cylinder 42 to increase the sealing action. However, when the piston 10 is moving downwardly on the suction stroke or when the compressor is being reciprocated but air is not bein compressed, such high pressure is not available to increase the sealing pressure of the lips 44. As a consequence, the resiliency of the rings tending to assume their free state must be relied on to exert a radial force to maintain the lips 44 in tight engagement with the walls of the cylinder 42. Such outward expansion or force is impeded only by the friction between the upper ring 28 at the annular edge 46 and between the lower ring 30 at the annular edge 48. In the present arrangement, the frictional effect is minimized since each ring acts independently at only one annular line of contact. By contrast, a single ring in a single groove would have two lines of contact and consequently greater resistance to radial outward movement of the rings 28 and 30.

One of the sources of leakage between the bottom and the top of a piston is the gap formed by the ends of a ring. In the present arrangement such leakage is minimized by positioning the gaps 180° apart at the time the rings 28 and 30 are assembled in their grooves 18. This relationship is retained permanently during the life of the rings, apparently due to the large surface area of contact between the lower face 32 of the upper ring 28 and the upper face 32 of the lower ring 30. The large area of contact prevents rotation of the rings 28 and 30 relative to each other and maintains the gaps formed by the ends 40 in their assembled position.

It will now be seen that a piston ring assembly has been provided in which a pair of positive twist rings are disposed in a single groove in such a manner that the gaps are maintained in their assembled, diametrically opposed state to minimize gas or oil passage and the rings each exert force separately in opposite direction to form line contact seals with the piston but without substantially diminishing the radial force pressing the ring lips into tight sealing engagement with the cylinder where the pair of lips of the ring assembly also form an annular oil retaining cavity to lubricate the cylinder wall.

What is claimed is:
1. In combination; a piston recirpocatingly positioned in a cylinder, said piston having an outer peripheral piston wall, a circumferential ring groove extending inwardly from said piston wall and having substantially parallel upper and lower annular groove surfaces terminating at upper and lower annular groove edges at said piston wall, a pair of positive twist split rings of substantially the same size and shape positioned in said groove, each said ring being generally circular and having a transverse gap, each said ring having a generally rectangular cross-sectional shape including substantially flat and parallel upper and lower surfaces, substantially flat inner and outer surfaces, and a chamfer between said upper and inner surfaces, said outer surface intersecting said lower surface at a knife edge, said rings being positioned in said groove with said transverse gaps circumferentially displaced from one another, said rings being radially compressed to reduce the size of said gaps and to dish said rings upwardly, said knife edges on each said ring being in engagement with the wall of said cylinder, said groove and rings being axially dimensioned so that said rings are axially stressed with said upper surface of one said ring adjacent said outer surface thereof engaging said upper groove surface adjacent said upper groove edge and with said lower surface of the other said ring adjacent said inner surface thereof engaging said lower groove surface, and said rings having their facing upper and lower surfaces engaging one another over substantially their entire area to prevent relative rotation between said rings.

* * * * *